M. NEWTON.
Check-Row Attachment for Corn-Planters.
No. 165,115. Patented June 29, 1875.
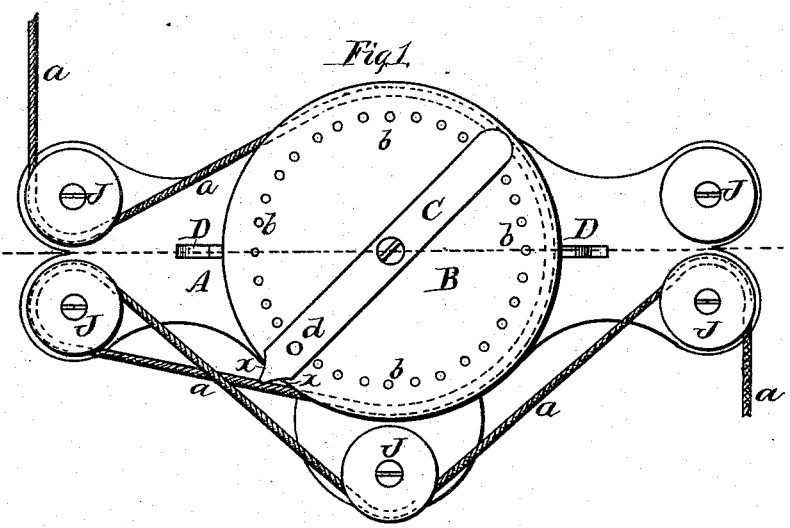
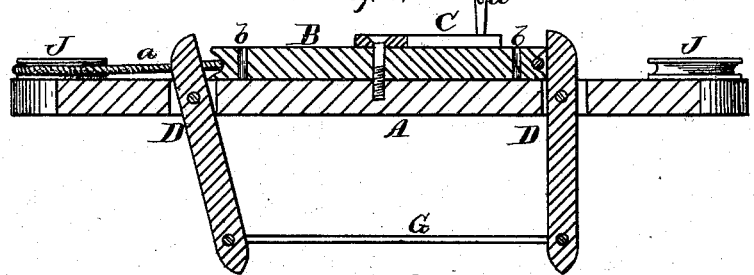
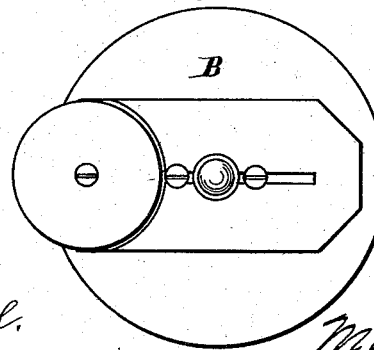
WITNESSES:
Jas. F. Duhamel.
Thomas. Byrne.
INVENTOR:
Madison Newton.
Per H. T. Abbot.
Attorney.

UNITED STATES PATENT OFFICE.

MADISON NEWTON, OF KENTLAND, INDIANA.

IMPROVEMENT IN CHECK-ROW ATTACHMENTS FOR CORN-PLANTERS.

Specification forming part of Letters Patent No. 165,115, dated June 29, 1875; application filed June 17, 1875.

*To all whom it may concern:*

Be it known that I, MADISON NEWTON, of Kentland, county of Newton and State of Indiana, have invented certain new and useful Improvements in Check-Row Attachment for Corn-Planters, of which the following is a specification:

The nature of my invention consists in the construction and arrangement of a check-row attachment for corn-planters, as will be hereinafter more fully set forth.

In order to enable others skilled in the art to which my invention appertains to make and use the same, I will now proceed to describe its construction and operation, referring to the annexed drawing, which forms a part of this specification, and in which—

Figure 1 is a plan view of my invention. Fig. 2 is a longitudinal section of the same. Fig. 3 shows a modified form of device to be placed upon the wheel for operating the levers.

A represents a wooden frame to extend transversely across the corn-planter to which the same may be attached. On this frame is a wheel, B, of any desired size, revolving around a stationary center. This wheel is grooved circumferentially for the reception of the rope $a$, with which motion is communicated to the rower. In the upper side of the wheel B is a series of holes, $b$ $b$, arranged at suitable distances apart, and in a circle concentric with the wheel. C is a bar pivoted on the axis of the wheel B, and having one end extending beyond the edge of the wheel; said projecting end being made V-shaped, or with two curved sides, $x$ $x$, as shown in Fig. 1 of drawings. This bar, which I call the eccentric, may be adjusted to any position on the wheel by a pin, $d$, passed through a hole in the same, and into either of the holes $b$ in the wheel. On each side of the wheel B in the frame A is a hole or mortise to admit the handles or levers D D of the corn-planter, which handles are connected to the dropper-bar G. The lateral motion is communicated to the dropper-bar by the eccentric bar C striking the handles D D alternately in each revolution of the wheel B, producing an oscillating motion of said handles, which in turn produces the lateral motion of the dropper-bar. At the ends of the frame A are suitable pulleys J J, arranged to lift the rope from the ground, and conduct it onto the wheel B.

This attachment can easily be adjusted to suit any corn-planter.

The wheel B may be rotated without dropping by simply removing the pin $d$. The eccentric may be suited to different distances between the handles of the planter by means of a slot or a series of holes therein, and it being secured in its position by set-screws.

This check-rower may be made to drill by placing a series of eccentrics on the wheel B, which then will strike the handles more frequently as the wheel revolves.

Having thus fully described my invention, what I claim as new, and desire to secure by Letters Patent, is—

1. The combination of the circumferentially-grooved wheel B, provided with a concentric series of holes, $b$, and the adjustable eccentric bar C, for the purposes herein set forth.

2. The combination of the grooved wheel B, with holes $b$, adjustable eccentric $c$, cord $a$, and pulleys J, all arranged on a frame, A, to operate the handles D D of a corn-planter, substantially as and for the purposes herein set forth.

In testimony that I claim the foregoing as my invention I hereunto affix my signature this 24th day of May, 1875.

MADISON NEWTON.

Witnesses:
EDWARD ROOT,
JOHN H. ASH.